United States Patent
Fukami et al.

(10) Patent No.: US 10,845,233 B2
(45) Date of Patent: Nov. 24, 2020

(54) WEIGHING APPARATUS WITH FLOWMETER FUNCTION

(71) Applicant: A&D COMPANY, LIMITED, Tokyo (JP)

(72) Inventors: Yuji Fukami, Saitama (JP); Haruna Kawaguchi, Saitama (JP)

(73) Assignee: A&D COMPANY, LIMITED, Tokyo (JP)

(*) Notice: Subject to any disclaimer, the term of this patent is extended or adjusted under 35 U.S.C. 154(b) by 190 days.

(21) Appl. No.: 16/248,217

(22) Filed: Jan. 15, 2019

(65) Prior Publication Data

US 2019/0226902 A1  Jul. 25, 2019

(30) Foreign Application Priority Data

Jan. 24, 2018  (JP) ................... 2018-009647

(51) Int. Cl.
*G01G 11/04* (2006.01)
*G01G 19/415* (2006.01)
(Continued)

(52) U.S. Cl.
CPC ........... *G01G 11/046* (2013.01); *G01F 1/007* (2013.01); *G01F 1/86* (2013.01); *G01G 13/285* (2013.01); *G01G 19/415* (2013.01)

(58) Field of Classification Search
CPC .. G01G 11/046; G01G 13/285; G01G 19/415; G01F 1/86; G01F 1/007
See application file for complete search history.

(56) References Cited

U.S. PATENT DOCUMENTS 3,446,299 A * 5/1969 Leonowicz .......... G01G 19/047
177/25.14
3,754,126 A * 8/1973 Williams, Jr. ......... G01G 11/18
702/175
(Continued)

FOREIGN PATENT DOCUMENTS

JP  2014-137250 A  7/2014

OTHER PUBLICATIONS

Computer translation of JP 2014-137250 from the JPO website downloaded Sep. 10, 2020.*

*Primary Examiner* — Randy W Gibson
(74) *Attorney, Agent, or Firm* — Roberts Calderon Safran & Cole P.C.

(57) ABSTRACT

Provided is a weighing apparatus with a flowmeter function includes a load sensor unit configured to detect a load of a flow rate calculation target, an A/D conversion unit configured to sequentially convert load signals from the load sensor unit into digital load data at predetermined intervals, an arithmetic processing unit configured to sequentially convert the load data into weighed values to calculate flow rate values, and a storage unit for storing the weighed values. The arithmetic processing unit calculates change amounts in weighed values and calculates a flow rate value based on a flow rate calculation cycle set based on a minimum time by which the change amounts become equal to or more than a change amount in weighed value, the change amount being calculated based on a minimum indication of weighed value and the required resolution of weighed value and satisfying a required resolution.

12 Claims, 5 Drawing Sheets

(51) Int. Cl.
*G01G 13/285* (2006.01)
*G01F 1/00* (2006.01)
*G01F 1/86* (2006.01)

(56) References Cited

U.S. PATENT DOCUMENTS

| | | | | |
|---|---|---|---|---|
| 4,467,844 | A | * | 8/1984 | Di Gianfilippo ....... G01F 23/20 141/1 |
| 5,046,569 | A | * | 9/1991 | von der Haar ........ G01G 11/08 177/123 |
| 5,148,841 | A | * | 9/1992 | Graffin ...................... B65B 3/28 141/128 |
| 5,585,604 | A | * | 12/1996 | Holm ................... G01G 19/035 177/133 |
| 6,334,471 | B1 | * | 1/2002 | Graffin .................... B67C 3/202 141/1 |

* cited by examiner

| Setting | Required resolution of flow rate values |
|---|---|
| Accuracy priority ↑ | 500 |
| Standard setting | 100 |
| Response speed priority ↓ | 50 |

WEIGHING APPARATUS WITH FLOWMETER FUNCTION

TECHNICAL FIELD

The present invention relates to a weighing apparatus such as an electronic balance or electronic scale, and more particularly, to a weighing apparatus with a flowmeter function for liquids and powders.

BACKGROUND ART

There has been known a weighing apparatus with a flowmeter function for accurately measuring the flow rates of liquids and powders (see, for example, Patent Literature 1).

Flow rate measurement using the weighing apparatus disclosed in Patent Literature 1 is performed as follows. For example, in weighing the amount of liquid injected into a vessel, the vessel is placed on the weighing pan of an electronic balance as a weighing apparatus, and configuration is made so that the mass of liquid injected from a tank into the vessel by a device such as a pump can be measured. A weighed value $W_0$ at time $t_0$ of the start of measurement is recorded.

Next, a weighed value $w_1$ is recorded in a similar manner as described above at time $t_1$ after the elapse of a predetermined interval (flow rate calculation cycle $\Delta t$) from time $t_0$. In this manner, weighed values $w_0, w_1, w_2, \ldots, w_n$ at times $t_0, t_1, t_2, \ldots, t_n$ are sequentially recorded in the flow rate calculation cycle $\Delta t$. A flow rate value $Q_n$ at time $t_n$ is obtained from "the difference between a weighed value at that time and a weighed value at the preceding time." Accordingly, the flow rate value $Q_n$ at predetermined time $t_n$ can be obtained by the equation given below:

$$Q_n = (w_n - w_{n-1})/\Delta t$$

CITATION LIST

Patent Literature

Patent Literature 1: Japanese Published Unexamined Patent Application No. 2014-137250

SUMMARY OF INVENTION

Technical Problem

The flow rate calculation cycle $\Delta t$ needs to be set in accordance with a flow rate and the accuracy required for its measurement, i.e., the accuracy expected for its calculated flow rate value (hereinafter referred to as "required resolution"). However, when performing measurement using the conventional weighing apparatus disclosed in Patent Literature 1, a measurer needs to calculate the flow rate calculation cycle $\Delta t$ based on the flow rate to be measured and the required resolution and change settings for the weighing apparatus for every measurement, resulting in complicated operations.

A specific study about setting of the flow rate calculation cycle $\Delta t$ with the use of a conventional weighing apparatus will be described by exemplifying a case in which a flow rate of about 6 g/min is to be measured by using an electronic balance whose minimum weighed value indication is 0.01 g with 3-digit significant figure accuracy, i.e., a resolution of 100.

Assume that in this description, the term "required resolution" means the accuracy required for a flow rate calculation value in this measurement, and the term "resolution" indicates a specific multiple of the minimum indication in the measurement to which an obtained weighed value corresponds. That is, when the minimum indication is 0.01 g and a weighed value is 1 g, the resolution is expressed as 100.

In calculating a flow rate with $\Delta t=1$ sec, since the amount of change in weighed value per sec is about 0.1 g and the minimum indication of the electronic balance is 0.01 g, the amount of change in weighed value detected becomes about 10 times the minimum indication.

Accordingly, the resolution of the calculated flow rate value is about 10. That is, the resolution is insufficient when it is required to secure 3-digit significant figure accuracy for flow rate values.

In calculating a flow rate with $\Delta t=1$ min, since the amount of change in weighed value per min is about 6 g and the minimum indication of the electronic balance is 0.01 g, the amount of change in weighed value detected becomes about 600 times the minimum indication.

Accordingly, the resolution of the calculated flow rate value is about 600. That is, the resolution is sufficient or excessive when it is required to secure 3-digit significant figure accuracy for flow rate values.

When, therefore, the flow rate calculation cycle $\Delta t$ is set to make the amount of change in weighed value detected become 1 g that is about 100 times the minimum indication, it is possible to perform measurement with a resolution of 100. Obviously, the time required for the amount of change in weighed value to become 1 g is 1 g/6 g/min=10 sec, and the flow rate calculation cycle $\Delta t$ should be 10 sec or more.

As described above, the flow rate calculation cycle $\Delta t$ must be set depending on the flow rate to be measured and its required resolution. In manually setting a flow rate calculation cycle, when pumps whose flow rates differ are checked with a predetermined accuracy or more, it is necessary to change settings for each pump. This requires troublesome operations. In addition, in some cases, an expected accuracy may not be obtained because of a setting error. In addition, if no guideline for a flow rate is known in advance, it is necessary to repeat measuring of a flow rate and setting of a flow rate calculation cycle, resulting in complicated operations.

It is, therefore, an object of the present invention to provide a weighing apparatus with a flowmeter function allowing an easy measuring operation, which can solve the above problems and automatically set a flow rate calculation cycle.

Solution to Problem

In order to achieve the above object, a weighing apparatus with a flowmeter function according to one aspect of the present invention includes a load sensor unit configured to detect a load of a flow rate calculation target and output load signals, an A/D conversion unit configured to sequentially convert the load signals into digital load data at predetermined intervals, an arithmetic processing unit configured to sequentially convert the load data into weighed values by correction computation and calculate flow rate values from the weighed values, and a storage unit configured to sequentially store the weighed values. The arithmetic processing unit calculates amounts of change in weighed value by using the weighed values stored in the storage unit. The arithmetic processing unit calculates, based on a minimum indication of weighed values and a required resolution of weighed values, an amount of change in weighed value satisfying the required resolution. The arithmetic processing unit calculates a minimum time by which the amount of change in weighed value becomes equal to or more than an amount of change in weighed value satisfying the required resolution, sets a flow rate calculation cycle based on the time, and calculates a flow rate value based on the flow rate calculation cycle.

In the above aspect, the arithmetic processing unit is also preferably configured to set a preset required resolution value as the required resolution.

In the above aspect, the arithmetic processing unit is also preferably configured to further include an input unit for inputting a required resolution value to the arithmetic processing unit, set an input required resolution value as the required resolution and calculate an amount of change in weighed value satisfying the required resolution based on the required resolution.

In the above aspect, the arithmetic processing unit is also preferably configured to include a plurality of preset required resolution settings, with the required resolution value being input by selecting one of the plurality of required resolution settings.

In the above aspect, the arithmetic processing unit is also preferably configured to include a plurality of preset flow rate calculation cycles and set the flow rate calculation cycle by selecting, from the plurality of flow rate calculation cycles, a shortest cycle that is equal to or more than a minimum time by which the amount of change in weighed value becomes equal to or more than an amount of change in weighed value satisfying the required resolution.

Benefit of Invention

According to the above configuration, changes in weighed value sequentially stored by the weighing apparatus are compared with the required amount of change determined from the required resolution of weighed values to calculate the minimum time that satisfies the required amount of change. The calculated time can be set as a flow rate calculation cycle. This can save labor of manually calculating and setting a flow rate calculation cycle in a measuring operation. This makes it possible to provide a weighing apparatus with a flowmeter function allowing an easy measuring operation, which can automatically calculate a flow rate calculation cycle.

DESCRIPTION OF THE EMBODIMENTS

The preferred embodiments of the present invention will be described below based on the following examples with reference to the accompanying drawings. The same reference signs denote components common to the respective examples, and a detailed description will be omitted.

First Example

Figure 1:
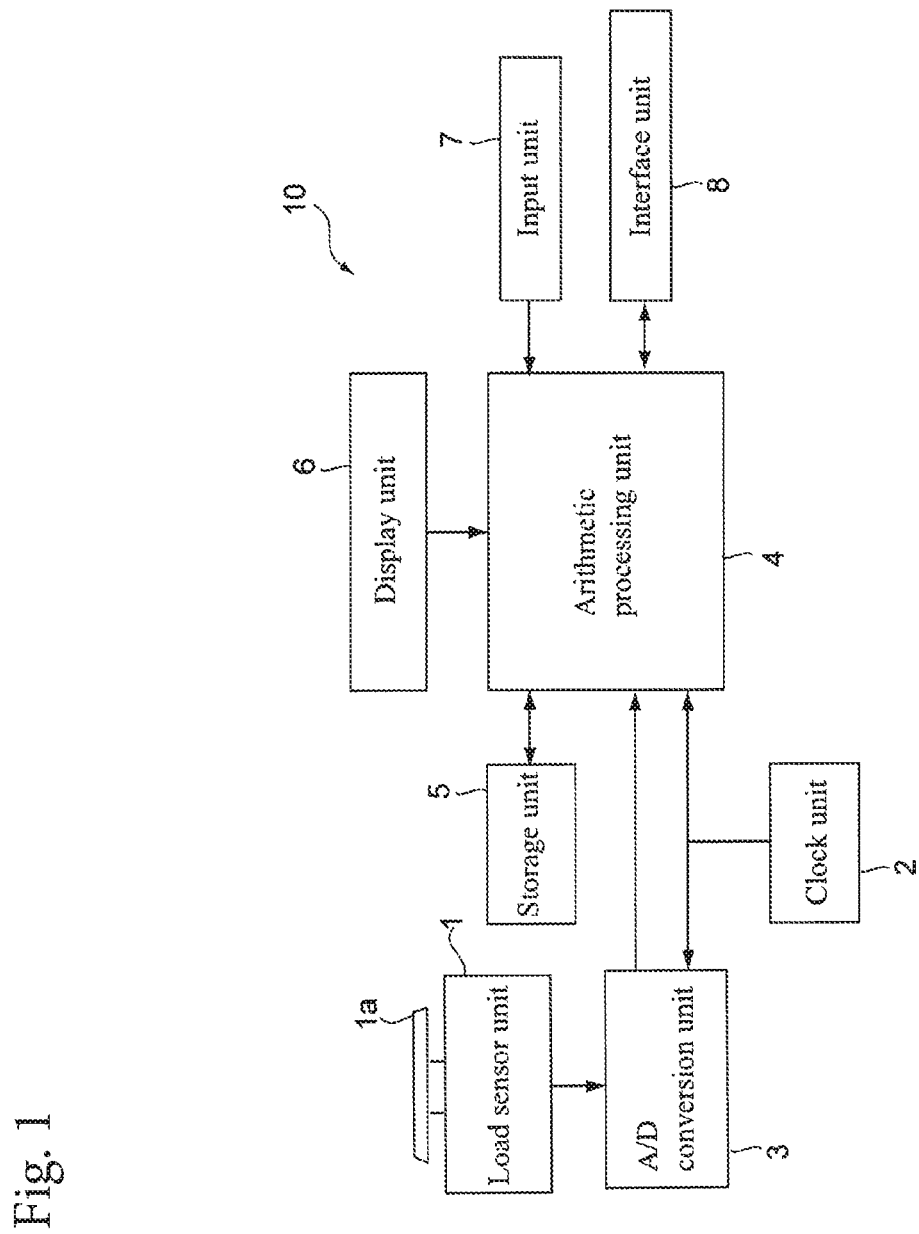
FIG. 1 is a block diagram of an electronic balance illustrating the internal structure of the electronic balance according to an embodiment of the present invention.
Figure 2:
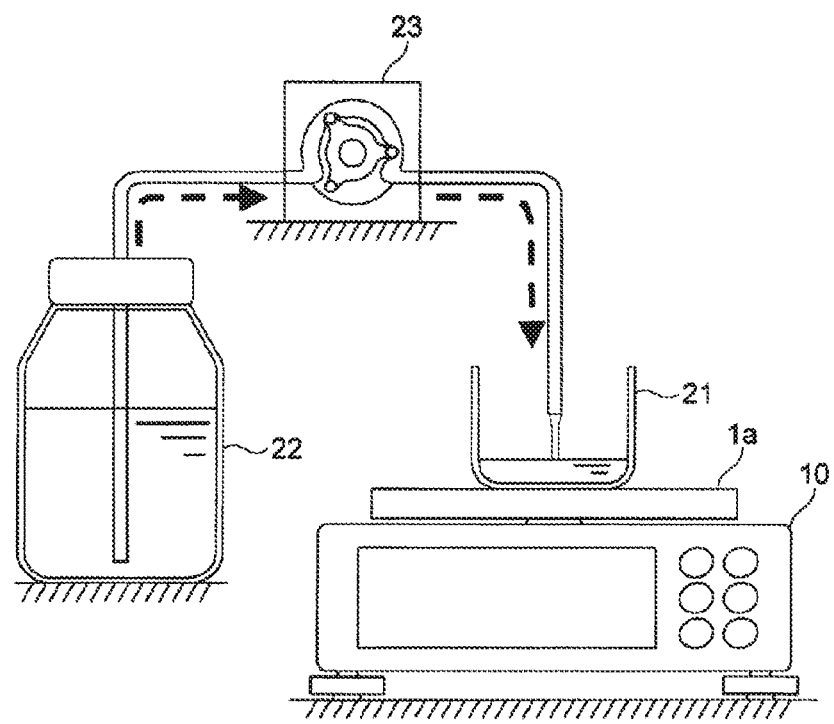
FIG. 2 is a schematic configuration view of the electronic balance according to the embodiment, illustrating the state where the electronic balance calculates the flow rate of liquid.

FIG. 1 is a block diagram illustrating the internal structure of an electronic balance 10 as an example of a weighing apparatus according to an embodiment of the present invention. FIG. 2 is a schematic configuration view illustrating the state where the electronic balance 10 calculates the flow rate.

The electronic balance 10 includes a load sensor unit 1, a clock unit 2, an A/D conversion unit 3, an arithmetic processing unit 4, a storage unit 5, a display unit 6, an input unit 7, and an interface unit 8.

The load sensor unit 1 is a load detection mechanism to detect a load of a weighing target. The load sensor unit 1 includes, for example, an electromagnetic balance sensor or load cell, and includes a weighing pan 1a on which a vessel 21 into which a liquid or powder as the weighing target is injected is placed. The load sensor unit 1 outputs an analog signal corresponding to a detected load.

The clock unit 2 is a clock generation circuit including, for example, a crystal oscillator. The clock unit 2 outputs reference time signals to the A/D conversion unit 3 and the arithmetic processing unit 4 at predetermined intervals.

The A/D conversion unit 3 is an A/D converter including an A/D conversion circuit. The A/D conversion unit 3 digitally converts analog load signals output from the load sensor unit 1 into load data at predetermined intervals based on reference time signals from the clock unit 2.

The arithmetic processing unit 4 is, for example, a microprocessor (MCU). The arithmetic processing unit 4 converts the load data output from the A/D conversion unit 3 into weighed values $w_1, w_2, \ldots$, at the predetermined intervals based on reference time signals, and causes the storage unit 5 to store the weighed values. In addition, the arithmetic processing unit 4 calculates amounts $\Delta w_1, \Delta w_2, \ldots$ of change in weighed value by using the weighed values $w_1, w_2, \ldots$ stored in the storage unit 5.

Note that representative symbols concerning weighed values and the amounts of change in weighed value are respectively represented by w and $\Delta w$ unless any specific time is designated.

The arithmetic processing unit 4 also sets a minimum indication $B_{\_MIN}$ and a required resolution $F_{\_REQ}$ of weighed values. The arithmetic processing unit 4 also calculates an amount $W_{\_SPC}$ of change in weighed value satisfying the required resolution $F_{\_REQ}$, based on the minimum indication $B_{\_MIN}$ and the required resolution $F_{\_REQ}$ of weighed values. The arithmetic processing unit 4 also calculates a time $T_{\_SPC}$ by which the amounts $\Delta w_1, \Delta w_2, \ldots$ of change in the weighed values become equal to or more than the amount $W_{\_SPC}$ of weighed value satisfying the required resolution $F_{\_REQ}$, and sets the time $T_{\_SPC}$ as a flow rate calculation cycle $\Delta T$.

Note that when the A/D conversion unit 3 or arithmetic processing unit 4 incorporates a unit corresponding to the clock unit 2, the clock unit 2 need not be provided independently.

The storage unit 5 is a rewritable memory such as a RAM or flash memory, and stores various data to be used by the arithmetic processing unit 4.

The display unit 6 is, for example, a liquid crystal display. The display unit 6 displays data such as weighing results, display information required for settings, and the like.

The input unit 7 is, for example, a key switch. A measurer can input commands such as so-called "perform taring," "output weighed value," and "select flow rate calculation mode" and various settings such as "required resolution" with this key switch.

Note that the display unit 6 and the input unit 7 may be integrated to be provided as a touch panel input unit.

The interface unit 8 is an interface used for connection to an external device such as a personal computer (not illustrated). The electronic balance 10 is configured to be connected to an external device via the interface unit 8. Accordingly, the electronic balance 10 outputs measured data to an external device and receives commands from an external device via the interface unit 8.

When the electronic balance 10 measures the flow rate of liquid injected into the vessel 21 by a pump 23, for example, the electronic balance 10 is arranged such that the liquid contained in a tank 22 is injected by the pump 23 into the vessel 21, as illustrated in FIG. 2.

Figure 3:
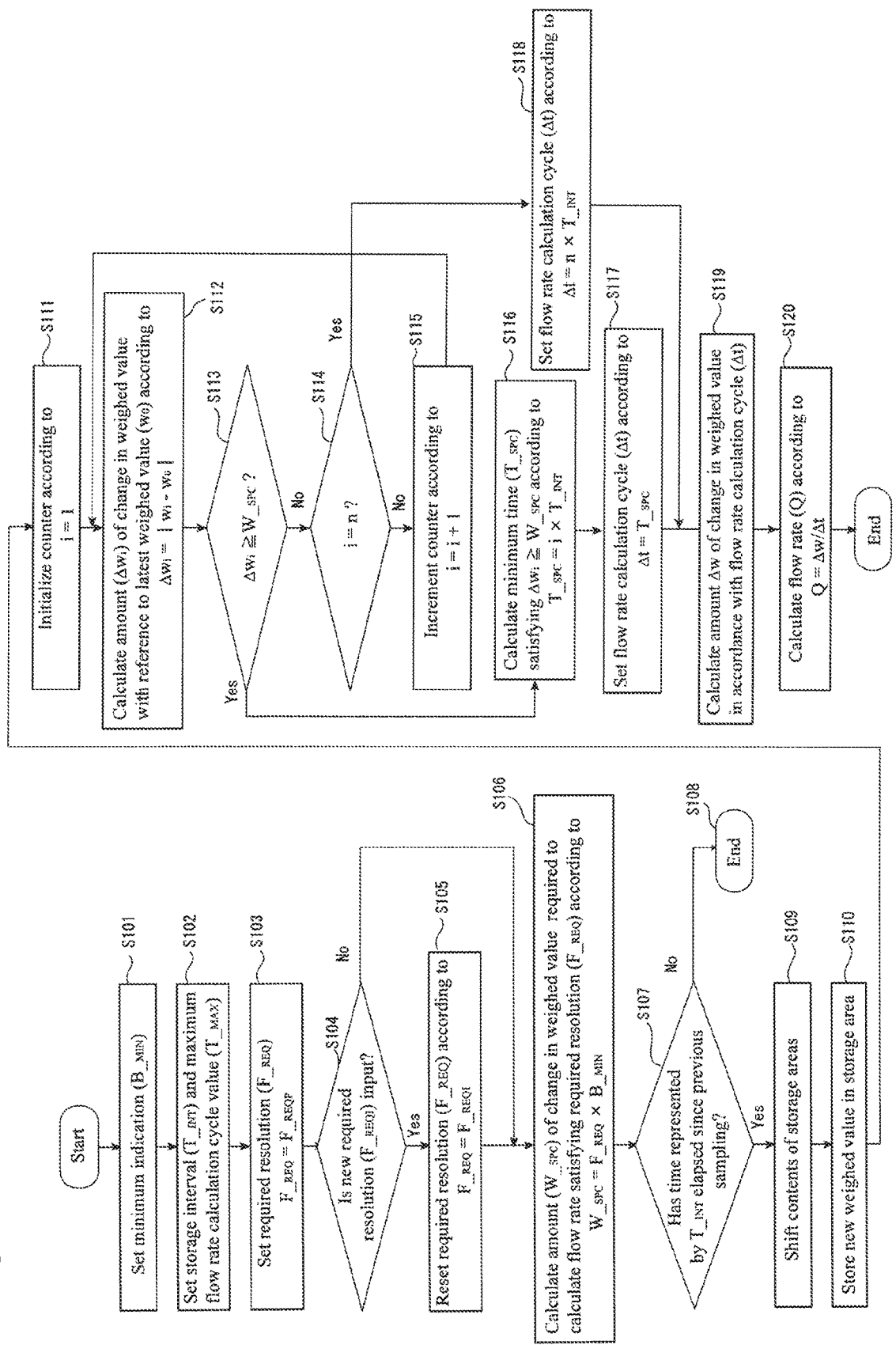
FIG. 3 is a flowchart for processing operations for flow rate calculation cycle setting performed by the electronic balance according to the embodiment.

Next, processing operations performed by the arithmetic processing unit 4 when the flow rate calculation cycle ΔT is automatically set and flow rate calculation is performed by using electronic balance 10 will be described with reference to FIG. 3. The following operations are incorporated in processing generally performed by the electronic balance 10. In general, the electronic balance 10 always stores weighed values w at predetermined storage intervals $T_{\_INT}$ (hereinafter, this operation will be referred to as "sampling").

When the flow rate measurement mode starts, the process shifts to step S101, in which the arithmetic processing unit 4 sets the preset minimum indication $B_{\_MIN}$ for the flow rate measurement mode.

Next, when the process shifts to step S102, the arithmetic processing unit 4 sets the storage interval $T_{\_INT}$ and a maximum value $T_{\_MAX}$ of the flow rate calculation cycle Δt, which are set in advance for the flow rate calculation mode. The maximum value $T_{\_MAX}$ of the flow rate calculation cycle Δt is a multiple of the storage interval $T_{\_INT}$ as $T_{\_MAX}=n \times T_{\_INT}$.

Next, when the process shifts to step S103, the arithmetic processing unit 4 sets a preset required resolution value $F_{\_REQP}$ to the required resolution $F_{\_REQ}$ of weighed values as initial values.

Next, when the process shifts to step S104 and a required resolution value $F_{\_REQI}$ determined by a measurer is input from the input unit 7 (YES in step S104), the process shifts to step S105 in which the arithmetic processing unit 4 resets the input required resolution value $F_{\_REQI}$ as the required resolution $F_{\_REQ}$. Next, when the process shifts to step S106, the arithmetic processing unit 4 calculates the amount $W_{\_SPC}$ of change in weighed value required to satisfy required resolution $F_{\_REQ}$ of weighed values, based on the input required resolution value $F_{\_REQI}$ according to equation (I) given below:

$$W_{\_SPC}=F_{\_REQ} \times B_{\_MIN} \qquad (I)$$

If no required resolution is newly input from the input unit 7 in step S104 (NO in step S104), the process shifts to step S106 in which the arithmetic processing unit 4 calculates the amount $W_{\_SPC}$ of change in weighed value required to satisfy the required resolution $F_{\_REQ}$ of weighed values based on the initial required resolution value $F_{\_REQP}$ according to equation (I).

Next, when the process shifts to step S107, the arithmetic processing unit 4 determines whether a time corresponding to the predetermined storage interval $T_{\_INT}$ has elapsed since previous sampling. When the storage interval $T_{\_INT}$ has not elapsed (NO in step S107), the process shifts to step S108 to terminate the processing. The electronic balance 10 then returns to its normal operation. When the storage interval $T_{\_INT}$ has elapsed (YES in step S107), the process shifts to step S109, in which the arithmetic processing unit 4 shifts the contents of weighed values stored in the memory as will be described later.

Processing in steps S107, S109, and S110 to be performed when the predetermined storage interval $T_{\_INT}$ has elapsed since previous sampling will be described in detail below with reference to FIG. 4.

As described above, the maximum value $T_{\_MAX}$ of the flow rate calculation cycle Δt is $T_{\_MAX}=n \times T_{\_INT}$. Accordingly, n+1 storage areas with memory numbers $M_0$, $M_1$, . . . , $M_n$ are generated in the storage unit 5 when the memory number $M_0$ is assigned to a storage area storing the latest weighed value.

The arithmetic processing unit 4 sequentially stores the weighed values w in the storage areas $M_n$ to $M_0$ at storage intervals $T_{\_INT}$. Accordingly, at the time of step S107, weighed values from a weighed value $w_{n+1}$ before time $n \times T_{\_INT}$ to the latest weighed value $w_1$ are respectively sequentially stored in the storage areas $M_n$, . . . , $M_1$ and $M_0$. In sampling after the elapse of the next storage interval $T_{\_INT}$, the existing weighed values $w_n$ to $w_0$ stored in the storage areas $M_{n-1}$ to $M_0$ are shifted to the storage areas $M_n$ to $M_1$, and the existing weighed value $w_{n+1}$ stored in the storage area $M_n$ is discarded (S109).

Next, when the process shifts to step S110, the new weighed value $w_0$ is stored in the storage area $M_0$. In this manner, weighed values sampled at the storage intervals $T_{\_INT}$, including the latest weighed value $w_0$ to the weighed value $w_n$ before time $n \times T_{\_INT}$, are sequentially stored in the storage unit 5 at the time of step S110.

Referring back to FIG. 3, when the process shifts to step S111, the arithmetic processing unit 4 first sets the value of a counter for the calculation of the flow rate calculation cycle Δt to initial value i=1.

Next, when the process shifts to step S112, the arithmetic processing unit 4 calculates an amount $\Delta w_i$ of change in weighed value, based on equation (II) given below:

$$\Delta w_i = |w_i - w_0| \qquad (II)$$

In this case, because i=1, $\Delta w_1 = |w_1 - w_0|$.

Next, when the process shifts to step S113, the arithmetic processing unit 4 compares the amount $\Delta w_i$ of change in weighed value with the amount $W_{\_SPC}$ of change in weighed value required to satisfy the required resolution $F_{\_REQ}$ of weighed values calculated in step S106 to determine whether inequality (III) given below is satisfied:

$$\Delta w_i \geq W_{\_SPC} \qquad (III)$$

When inequality (III) is satisfied (YES in step S113), the process shifts to step S116 in which the arithmetic processing unit 4 calculates $i \times T_{\_INT}$, i.e., $1 \times T_{\_INT}$, as the minimum time $T_{\_SPC}$ by which the required amount of change becomes equal to or more than the amount $W_{\_SPC}$ of change in weighed value.

When inequality (III) is not satisfied (NO in step S113), the process shifts to step S114 in which the arithmetic processing unit 4 determines whether the value i of the counter for the calculation of the flow rate calculation cycle Δt and a value n of the counter corresponding to the maximum value $T_{\_MAX}$ of flow rate calculation cycles satisfy equation (IV) given below:

$$i=n \qquad (IV)$$

When equation (IV) is not satisfied (NO in step S114), the process shifts to step S115, in which the arithmetic processing unit 4 to increment the counter to set i=i+1. The process then returns to step S112.

In this manner, while incrementing the counter, the arithmetic processing unit 4 repeats steps S112 to S115 until the amount $\Delta w_i$ of change in weighed value becomes equal to or more than the amount $W_{\_SPC}$ of change in weighed value required to satisfy the required resolution $F_{\_REQ}$. When the amount $\Delta w_i$ of change in weighed value becomes equal to or more than the amount $W_{\_SPC}$ of change in weighed value required to satisfy the required resolution $F_{\_REQ}$, the process shifts to step S116, in which the arithmetic processing unit 4 calculates the minimum time $T_{\_SPC}$ by which the amount $\Delta w_i$ of change in weighed value becomes equal to or more than the amount $W_{\_SPC}$ of change in weighed value required to satisfy the required resolution $F_{\_REQ}$. Next, the process shifts to step S117, in which the arithmetic processing unit 4 sets the time $T_{\_SPC}$ as the flow rate calculation cycle Δt.

When it is determined in step S114 that equation (IV) is satisfied (YES in step S114), the process shifts to step S118, in which the arithmetic processing unit 4 sets the maximum value $T_{\_MAX}$ of the flow rate calculation cycle Δt, i.e., $n \times T_{\_INT}$, as the flow rate calculation cycle Δt.

When the flow rate calculation cycle Δt is set in step S117 or S118, the process shifts to step S119, in which the arithmetic processing unit 4 calculates the amount Δw of change in weighed value corresponding to the time Δt, based on the set flow rate calculation cycle Δt.

Next, when the process shifts to step S120, the arithmetic processing unit 4 calculates a flow rate value Q based on equation (V) given below:

$$Q = \Delta w / \Delta t \qquad (V)$$

The arithmetic processing unit 4 then displays the calculated flow rate value Q on the display unit and terminates the processing. Note that the flow rate value Q may be output to an external device as needed.

Note that the process may omit step S103 and shift to step S104, in which arithmetic processing unit 4 sets the required resolution $F_{\_REQ}$ only based on an input required resolution value $F_{\_REQI}$ without setting the initial required resolution value $F_{\_REQP}$. Alternatively, the arithmetic processing unit 4 may set the required resolution $F_{\_REQ}$ only based on the preset initial required resolution value $F_{\_REQP}$ omitting steps S104 and S105.

Steps S114 and S118 are simply provided to set flow rate calculation cycle Δt by regarding the maximum value $T_{\_MAX}$ of flow rate calculation cycle as the minimum time $T_{\_SPC}$ satisfying the required amount $W_{\_SPC}$ of change determined from the required resolution $F_{\_REQ}$ when the minimum time $T_{\_SPC}$ by which the amount of change becomes equal to or more than the amount $W_{\_SPC}$ of change in weighed value satisfying the required resolution $F_{\_REQ}$ exceeds the maximum value $I_{\_MAX}$ of flow rate calculation cycles set in the electronic balance 10. Accordingly, for example, in step S118, the electronic balance 10 may be configured to display an error on the display unit to notify a measurer that the set cycle falls outside the settable range of the flow rate calculation cycle Δt so as to terminate the processing.

According to the above configuration, the weighing apparatus can compare the sequentially stored amount Δw of change in weighed value with the required amount $W_{\_SPC}$ of change determined from the required resolution $F_{\_REQ}$ of weighed values, automatically calculate the minimum time $T_{\_SPC}$ satisfying the required amount $W_{\_SPC}$ of change, and set the calculated time as the flow rate calculation cycle Δt. This saves labor of manually calculating the flow rate calculation cycle Δt and facilitates a measuring operation.

When the initial required resolution value $F_{\_REQP}$ is set as the required resolution $F_{\_REQ}$, in particular, a measurer can ensure a predetermined resolution without inputting the required resolution value $F_{\_REQI}$ from the input unit 7. In contrast, when a measurer inputs the input required resolution value $F_{\_REQI}$ from the input unit 7, since the flow rate calculation cycle Δt that can ensure the required resolution $F_{\_REQ}$ corresponding to the input value is set, it is possible to ensure a proper resolution in accordance with the purpose, etc., of an experiment or the like.

Even if the flow rate changes during measurement, since the flow rate calculation cycle Δt can be automatically changed in accordance with the change, it is possible to continue measurement satisfying a predetermined required resolution without repeatedly resetting the flow rate calculation cycle Δt for each change. This can facilitate a measuring operation. This provides, in particular in the case of using a pump that can cause a change in flow rate such as pulsation, a guide for the observation of the degree or cycle of the pulsation by monitoring a change in Δt over time.

When the measurer manually sets the flow rate calculation cycle Δt in accordance with pumps with different flow rates or a change in flow rate as in the conventional art, artificial errors can occur in reading of the flow rate value Q, calculation of the flow rate calculation cycle Δt, and setting of the flow rate calculation cycle Δt. In contrast to this, according to the above configuration, even if the measurer inputs a required resolution setting, he/she does not perform any operation other than inputting a required resolution setting. When the measurer inputs no required resolution setting, it is possible to automatically set the flow rate calculation cycle Δt without requiring any operation by the measurer. Therefore, the occurrence of artificial errors concerning the flow rate calculation cycle Δt is greatly reduced.

Second Example

A weighing apparatus according to the second example is an electronic balance having the same mechanical configuration as that of the electronic balance 10 according to the first example. However, the second example differs from the first example in that an arithmetic processing unit 4 has a plurality of required resolution settings saved in advance.

Figures 4, 5:
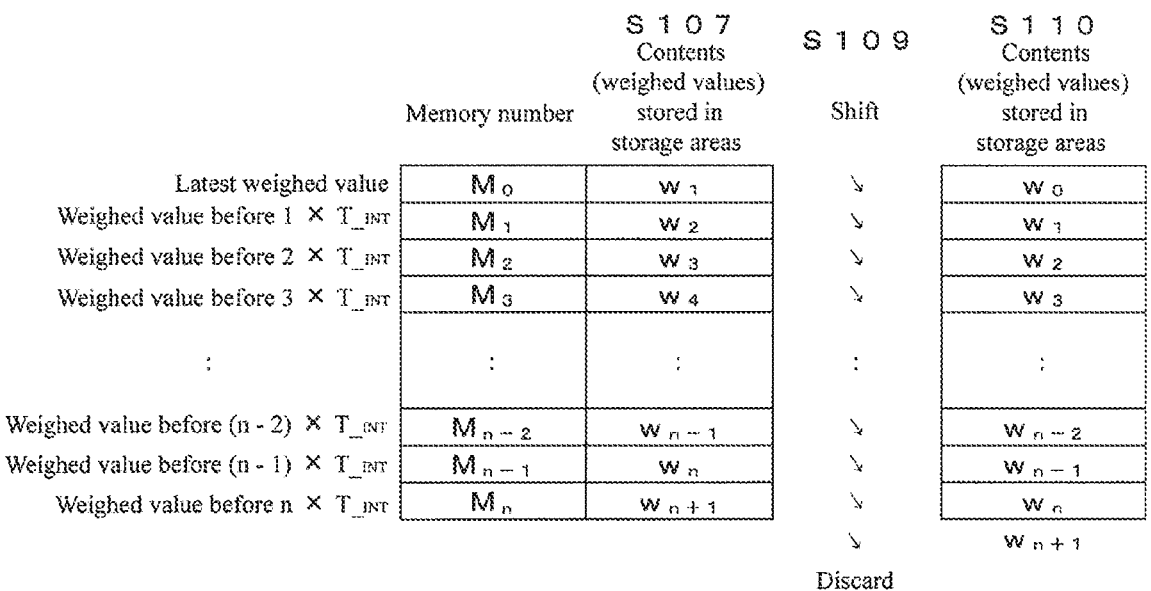
FIG. 4 is a view for explaining the details of processing operations for flow rate calculation cycle setting performed by the electronic balance according to the embodiment.
FIG. 5 is a view illustrating an example of required resolution setting in an electronic balance according to the second example.

For example, as illustrated in FIG. 5, required resolution settings of three levels, namely, "accuracy priority," "standard setting," and "response speed priority," are saved in the arithmetic processing unit 4. Values "500," "100," and "50" are preset for buttons corresponding to the three levels in an input unit 7, as input required resolution values $F_{\_REQI}$ corresponding to the required resolution settings of the three levels. The weighing apparatus is configured such that a measurer can input an input required resolution value $F_{\_REQI}$ corresponding to a required resolution setting by selecting one of the buttons.

The apparatus may also be configured so that a display unit 6 displays the required resolution settings of the three levels, namely, "accuracy priority," "standard setting," and "response speed priority," instead of the settings preset for the input unit 7, to enable the measurer to select one of the required resolution settings of the three levels displayed on the display unit 6, thereby allowing the measurer to input the required resolution value $F_{\_REQI}$ corresponding to the required resolution setting with the input unit 7.

The apparatus may also be configured to set the value "100" corresponding to "standard setting" as an initial required resolution value $F_{\_REQP}$ and set "500" or "50" as the input required resolution value $F_{\_REQI}$ respectively upon selection of "accuracy priority" or "response speed priority."

In this case, the measurer selects "accuracy priority" when the accuracy of measurement is prioritized for long-term treatment at a small flow rate, for example, when using an infusion pump. The measurer selects "standard setting" when, for example, measuring the capacity of a pump. The measurer selects "response speed priority" when measuring the degree or cycle of pulsation.

According to the above configuration, it is possible to easily input a required resolution and set a proper flow rate calculation cycle in accordance with the purpose of measurement regardless of the skill level of a measurer.

Third Example

A weighing apparatus according to the third example is an electronic balance with the same mechanical configuration as that of the electronic balance 10 according to the first example, but is configured to select a flow rate calculation cycle $\Delta t$ from a plurality of cycles $\Delta t_1, \Delta t_2, \Delta t_3, \ldots, \Delta t_j$ preset for the weighing apparatus. The maximum value of selectable cycles is a maximum value $T_{\_MAX}$ of the flow rate calculation cycles $\Delta t$. That is, for example, a plurality of cycles such as 1 sec, 2 sec, 5 sec, 10 sec, 20 sec, 30 sec, 1 min, 2 min, 5 min, 10 min, 20 min, 30 min, and 60 min are preset as selectable cycles in the arithmetic processing unit 4.

Figure 6:
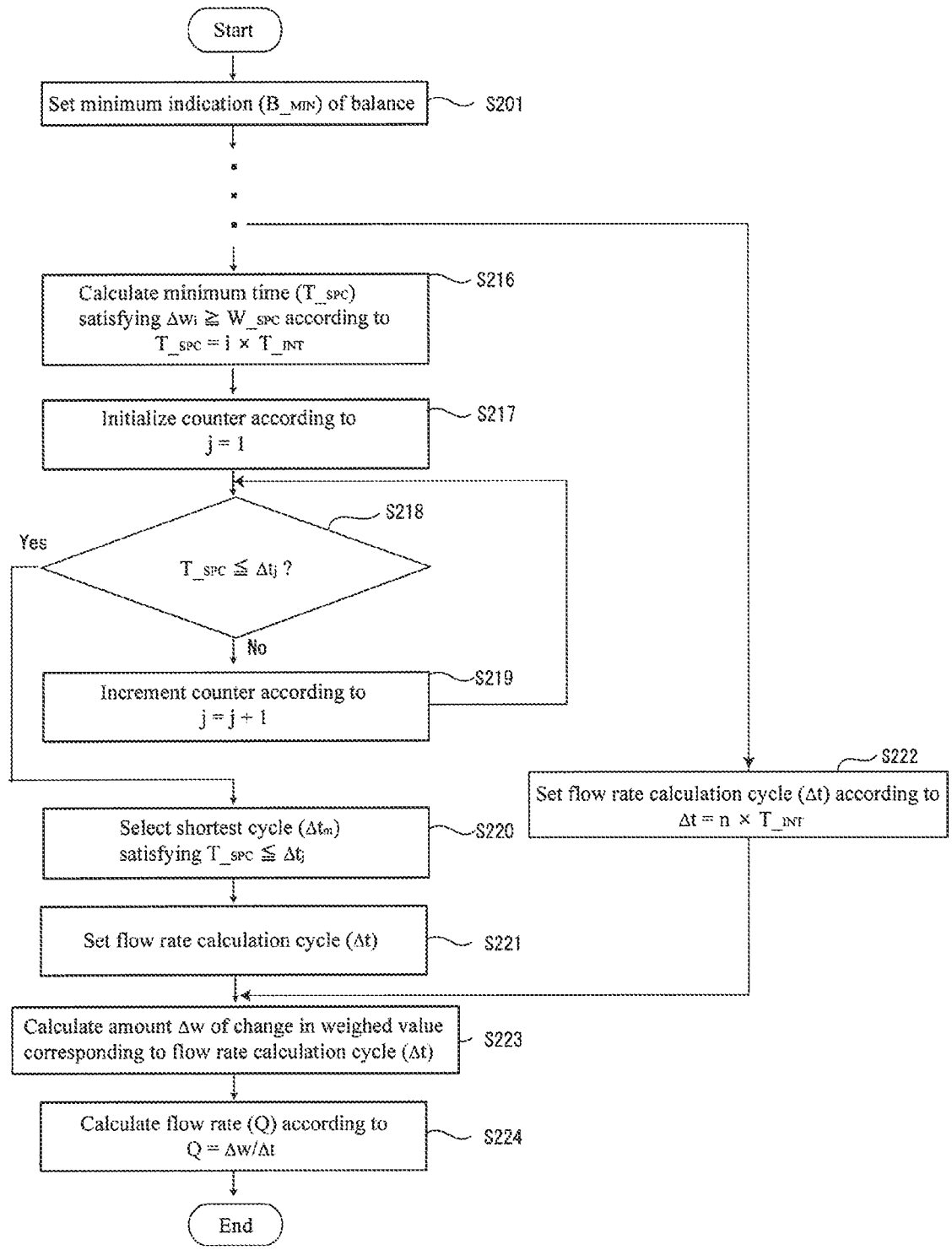
FIG. 6 is a flowchart for processing operations for flow rate calculation cycle setting performed by an electronic balance according to the third example, with part of the operations being omitted.

The processing operations performed by the arithmetic processing unit 4 will be described with reference to FIG. 6 by exemplifying the case of calculating a flow rate by automatically setting the flow rate calculation cycle $\Delta T$ using the weighing apparatus according to the third example.

Processing in steps S201 to S216 and S222, from the start of a flow rate calculation mode to the calculation of a minimum time $T_{\_SPC}$ satisfying a required amount $W_{\_SPC}$ of change, is the same as the processing in steps S101 to S116 and S118 according to the first example, respectively, an illustration of the processing will be partially omitted, and its description will be omitted.

When the process shifts to step S217, the arithmetic processing unit 4 sets a counter for the selection of the flow rate calculation cycle $\Delta t$ to j=1. The process then shifts to step S218 to determine whether the shortest cycle $\Delta t_1$ of a plurality of cycles is equal to or more than the minimum time $T_{\_SPC}$ satisfying the required amount $W_{\_SPC}$ of change, that is, whether inequality (VI) given below is satisfied:

$$T_{\_SPC} \leq \Delta t_j \quad \text{(VI)}$$

When inequality (VI) is satisfied (YES in step S218), the process shifts to step S220, in which the arithmetic processing unit 4 selects the shortest cycle $\Delta t_1$ of the plurality of cycles as the shortest cycle $\Delta t_m$ satisfying $T_{\_SPC} \leq \Delta t_j$. When inequality (VI) is not satisfied (NO in step S218), the process shifts to step S219, in which the arithmetic processing unit 4 increments the counter according to j=j+1. The process returns to step S218.

When the process returns to step S218, the arithmetic processing unit 4 determines again whether the time $T_{\_SPC}$ is equal to or less than a next cycle $\Delta t_2$. When the time $T_{\_SPC}$ is equal to or less than the next cycle $\Delta t_2$ (YES in step S218), the process shifts to step S220 to select the cycle $\Delta t_2$ as a shortest cycle $\Delta t_m$ satisfying $T_{\_SPC} \leq \Delta t_j$. When the time $T_{\_SPC}$ is larger than the next cycle $\Delta t_2$ (NO in step S218), the process shifts to step S219, in which the arithmetic processing unit 4 increments the counter. The process returns to step S218 again.

In this manner, the arithmetic processing unit 4 selects the shortest cycle $\Delta t_m$ equal to or more than the time $T_{\_SPC}$ by which one of amounts $\Delta w_1, \Delta w_2, \ldots$ of change in weighed value becomes equal to or more than the amount $W_{\_SPC}$ of change in weighed value satisfying a required resolution $F_{\_REQ}$.

Next, when the process shifts to step S221, the arithmetic processing unit 4 sets, as the flow rate calculation cycle $\Delta t$, the shortest cycle $\Delta t_m$ equal to or more than the time $T_{\_SPC}$ by which the amount of change becomes equal to or more than the amount $W_{\_SPC}$ of change in weighed value satisfying the required resolution $F_{\_REQ}$.

Next, in step S223, the arithmetic processing unit 4 recalculates an amount $\Delta w$ of change in weighed value corresponding to the time $\Delta t$ based on the flow rate calculation cycle $\Delta t$ set in step S221 or S222.

Next, when the process shifts to step S224, the arithmetic processing unit 4 calculates a flow rate value Q based on equation (VII) given below:

$$Q = \Delta w / \Delta t \quad \text{(VII)}$$

and displays the calculated flow rate value Q. The arithmetic processing unit 4 then terminates the processing.

According to the above configuration, since the flow rate calculation cycle $\Delta t$ to be set is selected from the plurality of preset cycles $\Delta t_1, \Delta t_2, \Delta t_3, \ldots, \Delta t_j$, a round number can be set as the flow rate calculation cycle $\Delta t$. When approximate flow rates are to be measured, in particular, the same flow rate calculation cycle is set for each flow rate calculation cycle setting, and hence measurement can be performed with high repeatability while a flow rate calculation cycle is set in accordance with a flow rate.

Although each of the above cases has exemplified the measurement of the flow rate of liquid injected into the vessel 21 placed on the weighing pan 1a, measurement targets are not limited to liquids but may include powders. In addition, the weighing apparatus according to each embodiment may be configured to measure the flow rate of liquid discharged from a vessel placed on the weighing pan 1a or the amount of change in material evaporating or vaporizing from a vessel placed on the weighing pan 1a.

Although the preferred embodiments of the present invention have been described, the above examples are examples of the present invention. These embodiments can be combined based on the knowledge of a person skilled in the art. Such combined embodiments are incorporated in the scope of the present invention.

REFERENCE SIGNS LIST

1: Load sensor unit
3: A/D conversion unit

4: Arithmetic processing unit
5: Storage unit
7: Input unit
10: Electronic balance (Weighing apparatus)
$T_{\_TNT}$: Storage interval
$w$, $w_1$: Weighed value
$\Delta w$, $\Delta w_1$: Amount of change in weighed value
$B_{\_MIN}$: Minimum indication of weighed value
$F_{\_REQ}$: Required resolution
$W_{\_SPC}$: Weighed value corresponding to amount of change in weighed value satisfying required resolution
$T_{\_SPC}$: Minimum time by which amount of change in weighed value becomes equal to or more than amount of change in weighed value satisfying required resolution
$\Delta t$: Flow rate calculation cycle
Q: Flow rate value

The invention claimed is:

1. A weighing apparatus with a flowmeter function comprising:
a load sensor unit configured to detect a load of a flow rate calculation target and output load signals;
an A/D conversion unit configured to sequentially convert the load signals into digital load data at predetermined intervals;
an arithmetic processing unit configured to sequentially convert the load data into weighed values by correction computation and calculate flow rate values from the weighed values; and
a storage unit configured to sequentially store the weighed values, wherein
the arithmetic processing unit calculating an amount of change in weighed value by using the weighed values stored in the storage unit,
calculating, based on a minimum indication of weighed values and a required resolution of weighed values, an amount of change in weighed value satisfying the required resolution,
calculating a minimum time by which the amount of change in weighed value becomes equal to or more than an amount of change in weighed value satisfying the required resolution, setting a flow rate calculation cycle based on the time, and calculating a flow rate value based on the flow rate calculation cycle.

2. The weighing apparatus with the flowmeter function according to claim 1, wherein the arithmetic processing unit sets a preset required resolution value as the required resolution.

3. The weighing apparatus with the flowmeter function according to claim 1, further comprising an input unit for inputting a required resolution value to the arithmetic processing unit, wherein
the arithmetic processing unit setting an input required resolution value as the required resolution and calculating an amount of change in weighed value satisfying the required resolution based on the required resolution.

4. The weighing apparatus with the flowmeter function according to claim 2, further comprising an input unit for inputting a required resolution value to the arithmetic processing unit, wherein
the arithmetic processing unit setting an input required resolution value as the required resolution and calculating an amount of change in weighed value satisfying the required resolution based on the required resolution.

5. The weighing apparatus with the flowmeter function according to claim 1, wherein the arithmetic processing unit comprises a plurality of preset required resolution settings, and
the required resolution value is input by selecting one of the plurality of required resolution settings.

6. The weighing apparatus with the flowmeter function according to claim 2, wherein the arithmetic processing unit comprises a plurality of preset required resolution settings, and
the required resolution value is input by selecting one of the plurality of required resolution settings.

7. The weighing apparatus with the flowmeter function according to claim 3, wherein the arithmetic processing unit comprises a plurality of preset required resolution settings, and
the required resolution value is input by selecting one of the plurality of required resolution settings.

8. The weighing apparatus with the flowmeter function according to claim 4, wherein the arithmetic processing unit comprises a plurality of preset required resolution settings, and
the required resolution value is input by selecting one of the plurality of required resolution settings.

9. The weighing apparatus with the flowmeter function according to claim 1, wherein the arithmetic processing unit includes a plurality of preset flow rate calculation cycles,
the arithmetic processing unit setting the flow rate calculation cycle by selecting, from the plurality of flow rate calculation cycles, a shortest cycle that is equal to or more than a minimum time by which the amount of change in weighed value becomes equal to or more than an amount of change in weighed value satisfying the required resolution.

10. The weighing apparatus with the flowmeter function according to claim 2, wherein the arithmetic processing unit includes a plurality of preset flow rate calculation cycles,
the arithmetic processing unit setting the flow rate calculation cycle by selecting, from the plurality of flow rate calculation cycles, a shortest cycle that is equal to or more than a minimum time by which the amount of change in weighed value becomes equal to or more than an amount of change in weighed value satisfying the required resolution.

11. The weighing apparatus with the flowmeter function according to claim 3, wherein the arithmetic processing unit includes a plurality of preset flow rate calculation cycles,
the arithmetic processing unit setting the flow rate calculation cycle by selecting, from the plurality of flow rate calculation cycles, a shortest cycle that is equal to or more than a minimum time by which the amount of change in weighed value becomes equal to or more than an amount of change in weighed value satisfying the required resolution.

12. The weighing apparatus with the flowmeter function according to claim 4, wherein the arithmetic processing unit includes a plurality of preset flow rate calculation cycles,
the arithmetic processing unit setting the flow rate calculation cycle by selecting, from the plurality of flow rate calculation cycles, a shortest cycle that is equal to or more than a minimum time by which the amount of change in weighed value becomes equal to or more than an amount of change in weighed value satisfying the required resolution.

* * * * *